Sept. 5, 1950     R. S. BABCOCK     2,521,199
METHOD OF AND APPARATUS FOR HIGH-SPEED,
HIGH-PRESSURE OXYGEN CUTTING OF METALS
Filed June 14, 1947

INVENTOR
ROGER S. BABCOCK
BY
ATTORNEY

Patented Sept. 5, 1950

2,521,199

UNITED STATES PATENT OFFICE 2,521,199

METHOD OF AND APPARATUS FOR HIGH-SPEED, HIGH-PRESSURE OXYGEN CUTTING OF METALS

Roger S. Babcock, Plainfield, N. J., assignor to The Linde Air Products Company, a corporation of Ohio Application June 14, 1947, Serial No. 754,710

10 Claims. (Cl. 148—9)

This invention relates to the art of cutting metals with a stream of oxygen, particularly to an improved method and apparatus for high speed severing of ferrous metal bodies by the application of a high velocity jet of oxygen against successive heated portions of a surface of the metal body to thermochemically form a cut or kerf.

The principal objects of the present invention are to provide an improved method of cutting metal bodies with an oxygen stream supplied at high pressure and discharged from a divergent outlet nozzle in a manner which provides substantially higher severing speeds and greater economy than customary oxygen cutting methods but without requiring the use of impractically high oxygen supply pressures and while also producing cuts of a quality equal or better than is produced by standard cutting methods. A further principal object is to provide an improved nozzle and associated apparatus for practicing such method.

Nozzles with cylindrical oxygen outlet bores customarily are employed with oxygen head pressures ranging up to 80 p. s. i. gauge, the pressure employed varying according to the thickness of the steel to be severed. Recently some limited use has been made of cutting nozzles having divergent or expanding outlet orifices similar to that disclosed in U. S. Patent No. 1,985,080 and employing cutting oxygen head pressures not much over 100 p. s. i. gauge. In such nozzles the oxygen passes through a passage having a narrow throat portion and a divergent outlet portion in which the oxygen expands at a rate sufficient to effect a smooth conversion of pressure energy into velocity energy so that the oxygen is discharged from the mouth of the nozzle at a velocity exceeding the acoustic velocity. Thus for a given rate of cutting oxygen flow the jet produced has a narrower width and a higher velocity than the jet produced by an equivalent cylindrical bore nozzle. These properties are useful in that a given thickness of metal can be cut with slightly lower gas consumption, less loss of metal, and somewhat greater cutting speed, which latter advantage results in some saving of labor cost.

Higher than acoustic jet velocities are best obtained by employing divergent outlet cutting nozzles which must be designed for use with a particular head pressure.

In cutting with divergent outlet nozzles there are many factors variously interdependent that may be briefly stated as follows:

1. Composition of steel to be cut and its surface cleanness.
2. Temperature of the steel to be cut.
3. Thickness of the steel to be cut.
4. The amount of drag or lag that is permissible.
5. Intensity of the preheat flames accompanying the jet.
6. Height of the nozzle above the work surface.
7. Head pressure of the cutting oxygen.
8. Velocity of the cutting jet.
9. Quantity of oxygen in the cutting jet (cubic feet per hour).
10. Discharge pressure at the mouth of the nozzle.
11. Ratio of nozzle mouth area to throat area termed expansion ratio.
12. Initial temperature of the cutting oxygen.

As many as possible of these variables are the same for comparison purposes. Thus (1), (2), and (3) are the same in each case where examples are compared. (4) This is either the maximum that provides complete severance of a rectangular workpiece when highest speed of cutting is desired or is a fixed amount less than such maximum when a high quality cut is to be made. The quality of cut herein referred to is measured by the deviation from a plane surface of the kerf walls. (5) The size and intensity of preheat flame that accompanies the cutting jet are the same in each instance of comparison. (6) The height of the nozzle from the work surface is always such that the hottest part of the heating flame is at the work surface and is the same for comparison. (7) The head pressure employed is an important feature of the invention as set forth hereinafter. The customary procedures employed pressures up to about 100 p. s. i. gauge. (8) The velocity is only slightly affected by head pressure for any given nozzle. The higher velocities are desired to provide higher cutting speed and this is obtained by divergent outlet nozzles with an expansion ratio adjusted according to the design head pressure so as to provide a desired discharge pressure. (9) This is determined by the size of the nozzle and the flow rate employed is roughly proportioned according to the thickness of metal to be cut. In comparisons the flow rate is the same for each thickness cut. (10) The mouth pressure used is an important feature of the invention and it is dependent on the expansion ratio used with a given head pressure. (11) This, as noted above, is interdependent with 7 and 10 and determines the velocity 8. (12) Temperature has some effect on velocity and cutting speed but is kept constant.

Thus with divergent outlet types of cutting nozzles the exit cutting oxygen velocity obtainable increases with the expansion ratio employed but this also requires increasing head pressures in order to maintain approximately constant mouth pressure which according to the invention is desired.

Tests made with nozzles designed to expand the oxygen jet from head pressures of 1500 p. s. i. to 5000 p. s. i. to atmospheric have indicated that with other conditions constant, successively smaller increases of cutting speed were obtained with head pressures above 1500 p. s. i. and, in the absence of evidence to the contrary, it had heretofore been assumed that there would be an approximately straight-line relation between cutting speed and head pressure with nozzles designed for each head pressure up to 1500 p. s. i.

Attempts to design expanding or divergent nozzles for any particular head pressure and flow rate by purely theoretical calculations proved unsatisfactory due to variables such as the heat transfer from nozzle to gas, frictional drag, vena contracta effect, etc. which are involved in the flow of oxygen through the cutting nozzle. Therefore the successful series of cutting nozzles is designed empirically.

According to this invention a series of nozzles for different thicknesses of work is provided for using cutting oxygen at head pressures of 450 to 600 p. s. i. gauge. The selection of this head pressure is based upon a discovery that at about 500 p. s. i. head pressure over three-quarters of the practically available cutting speed increase is obtainable and that there is a knee in the curve showing the relation between head pressure and cutting speed for nozzles discharging at a given constant mouth pressure, such knee being at about 500 p. s. i. The selected head pressure is unique in that not only is there obtained the advantages of the narrowness of kerf and of the speed increase substantially greater in amount than would be expected, but the 500 p. s. i. head pressure has the advantage that it is practical to provide apparatus including blowpipe, cutting machine and oxygen source that can be used safely at such pressure in commercial cutting with oxygen. Further according to the invention there is provided a series of cutting nozzles with cutting oxygen passages having inlet, throat, and divergent portions proportioned to provide high efficiency at high cutting speeds with a head pressure of the order of 500 p. s. i. and there is provided an apparatus for safely supplying oxygen at a maximum of 600 p. s. i. to a cutting blowpipe carrying such nozzle. Also according to the invention, it has been discovered that with divergent outlet nozzles for about 500 p. s. i. head pressure, it is possible and advantageous to determine the cutting results desired as to quality or extreme speed by preselecting the exit or mouth pressure of the oxygen jet within a range of from 10 to 30 p. s. i. absolute. Since mouth pressure is a function of the expansion ratio employed with a given head pressure, it is possible to select combinations of orifice and mouth sizes for a given head pressure and flow volume which will provide the desired mouth pressure. Accordingly for one series of nozzles the exit pressure is preferably between 20 to 30 p. s. i. absolute to provide the highest speed and lowest cost in oxygen cutting. On the other hand it is found that exit pressures of about atmospheric or below, i. e., mouth pressures between 20 and 10 p. s. i. absolute, are found to provide optimum quality cuts with another series of nozzles.

The high speed cuts are particularly useful for economical production severing of steel shapes. In a trial of the process according to the invention employing 20 to 30 p. s. i. absolute exit pressure, the cost of cutting plates to size was reduced from 32% to 56% of the former cost per ton by the standard method under comparative conditions and at the same time the tonnage processed was increased from 64% to 150% over that processed by the standard method, and the oxygen consumption per foot of cut was reduced up to 53%. The quality of cut was equal to or better than that produced by the standard method. With the cutting process according to the invention it is found generally that the thicker the workpiece, the greater is the improvement in cutting speed and economy over standard practice; for example, in tests on ½ inch thick steel plate the increase of speed was 33%, the cutting oxygen consumption was reduced 43%, and the over-all cost per foot of cut was reduced 19%. On thicker work the improvements are greater. Thus in tests on 3-inch, 6-inch and 8-inch thick steel shapes, cutting speed increases of 122%, 172%, and 150% respectively were obtained, with a reduction of the cutting oxygen consumption of about 30%, 51%, and 53% respectively, and a reduction of total cost per foot of about 46.5%, 59%, and 58% respectively. In a test on 12-inch thick steel the cutting speed increase was 117% with a cutting oxygen consumption reduction of 36% and reduction of the total cost of 45%. The above tests were made under average production conditions for complete severance and still greater improvements could be obtained under specially controlled conditions.

For high quality cuts useful particularly in shape cutting, the cutting lag must be kept to a minimum and therefore there is some sacrifice of the attainable cutting speed. An expansion ratio is selected to provide an exit pressure moderately below atmospheric. For thicknesses up to about eight inches a preferred exit pressure is about 12.5 p. s. i. absolute. Under such condition cuts of highest quality are produced at a speed which is also much greater than obtained in standard practice high quality shape cutting and with an important saving of oxygen consumption.

For example, tests with nozzles designed for a discharge pressure of 12.5 p. s. i. absolute, 6-inch thick steel was cut with speed increases of 60% to 100%, 1-inch thick steel was cut 75% faster, and the costs were 30% to 45% less. The quality of these cuts was considerably better than that of the best cuts by standard machine cutting. The quality is measured according to the deviation of the kerf wall from plane surfaces.

For more general cutting practice nozzles employing a compromise of the jet exit pressure will be preferable in which the expansion ratio is such that the exit pressure is between 15 and 20 p. s. i. absolute.

To produce an oxygen cutting jet either for high quality cuts at high speed or for highest speed cuts, the oxygen is supplied at a pressure of about 450 to 600 p. s. i. gauge to a cylindrical inlet portion of the oxygen passage through the nozzle. The diameter of such stream is reduced by an amount such that the ratio of the initial diameter over the reduced diameter is not less than about 2.3. This reduction is preferably made gradually rather than suddenly. The stream is flowed at the reduced diameter for a distance between one and three times such reduced diameter in a throat portion of the nozzle. The stream is then expanded at a rate to increase its velocity, the expansion being such that the cross-sectional area is increased 3.35 to 7.45 times according to the discharge pressure required for the type of cutting. This expansion preferably occurs in a divergent outlet portion of the nozzle which has walls diverging at an included angle between 6 and 10 degrees. Then the jet is discharged from the mouth of the divergent portion at an exit pressure immediately before the jet enters the atmosphere of between 10 to 30 p. s. i. absolute, according to the cutting results desired. For example, for highest speed cutting of thick work the exit pressure will be close to 30 p. s. i. with an expansion ratio of about 3.35, for highest quality cuts the exit pressure will be atmospheric or slightly below atmospheric (an expansion ratio of 6.35 for a discharge pressure of 12.5 p. s. i. absolute), and for general purposes the exit pressure is preferably between atmospheric and 20 p. s. i. absolute with expansion ratio between 5.6 and 4.7. Such jet is directed against the metal body to be cut, the point of initial impingement of the stream on the metal being at the ignition temperature, such point being preferably raised to ignition temperature by heating flames that may accompany the cutting jet in the customary manner.

The above and other objects and novel features of the invention will become apparent from the following description having reference to the annexed drawings, in which:

Fig. 1 is a diagrammatic view of an apparatus for carrying out the method according to the invention, including means for supplying oxygen under 500 to 600 p. s. i. pressure to a cutting machine carrying a nozzle constructed according to the invention;

Fig. 2 is a view of a longitudinal section through an exemplary form of nozzle employed with the apparatus of Fig. 1 and having a cutting oxygen passage constructed and arranged according to the invention; and Fig. 3 is a view of a longitudinal section through a modified form of the nozzle.

Referring now to the drawing, and particularly to Fig. 1, there is illustrated one way of supplying oxygen at about 500 p. s. i. gauge to a cutting apparatus, it being understood that any other source of oxygen could be employed provided that the desired volume at 500 to 600 pounds pressure is economically supplied. In Fig. 1 a supply of liquid oxygen is held in the inner vessel 10 of an insulated container C. The vessel 10 is supported within an outer casing 11 with highly effective heat insulation 12 between the vessel and casing. The vessel 10 is also provided with a liquid phase filling line 13 closed by a valve 13' and a gas phase conduit 14 controlled by a valve 14' and having a pressure relief valve 15 connected therewith a communicate with vessel 10. A liquid withdrawal line 16 is connected between the bottom of the vessel 10 and the suction side of a liquid oxygen pump 17. Such pump may be of any type capable of pumping liquid oxygen against 500 p. s. i. pressure such as that illustrated in U. S. Patent No. 2,292,375 of O. A. Hansen. The pump 17 is illustrated diagrammatically as being driven by an electric motor 18. The pump discharge side is connected to a vaporizing coil 19 that is heated by a heating fluid circulated through a jacket 20 surrounding the coil 19. A pipe line 21 conducts the vaporized oxygen now under pressure, to a cutting station S which may be one of several stations.

To smooth out pressure variations there is preferably connected to the pipe line 21 a gas receiver 22 of suitable capacity, and to maintain a supply at about 500 to 600 p. s. i. in the pipe line there is preferably employed a means for starting and stopping the pump such as a pressure switch 23 in pressure communication with the receiver 22 and having switch elements connected electrically by wires 24 to the electric motor 18 or its control.

At the cutting station there is illustrated at W a workpiece in the form of a rectangular billet to be severed. A cutting nozzle N at the lower end of a cutting blowpipe 25 is held normal to the top surface of the workpiece W to impinge a cutting jet from the nozzle against such top surface for forming the cut or kerf 26 through the workpiece. The blowpipe 25 is carried and moved by a cutting machine of suitable type, for example a straight-line cutting machine 27 of the customary type. The machine 27 is self-propelled to travel along a track 28 at the desired adjustable cutting speed which will be higher than that customarily employed. The cutting machine 27 is also provided with the customary blowpipe holding and adjusting mechanism 29 in order to position the nozzle at the proper height above the work W. At the head 30 or upper end of the blowpipe 25 there are preferably at least three connections each controlled by one of three suitable valves 31. One of these connections for cutting oxygen is coupled to a high pressure type flexible hose 32 that connects with the cutting station S through a stop valve 33. Another of the connections for a supply of heating flame oxygen communicates through a flexible hose 34 with the outlet of a pressure-reducing regulator 35 that has its inlet connected by pipe 36 to the cutting station through a stop valve 37. The fuel for the preheating flames is supplied through a flexible hose 38 connected between the remaining connection of the head 30 and the outlet of a pressure regulator 39 which is connected to a source of acetylene or other fuel gas, for example, a cylinder 40. The blowpipe 25 has a passage therethrough designed for about 500 p. s. i. pressure for conducting the cutting oxygen to the cutting oxygen inlet of the nozzle N. The blowpipe also has customary means therein for mixing the preheating oxygen and the fuel gas supplied through hoses 34 and 38 and delivering the mixture to the preheating passages of the nozzle N.

The nozzle N, as illustrated in Fig. 2, comprises a nozzle body 41 having an inlet end 42 shaped to cooperate with the end of the blowpipe 25 and also a collar portion 43 to cooperate with means for holding the nozzle to the blowpipe 25. The nozzle N is provided with customary preheat flame passages that are spaced symmetrically with respect to the axis of the nozzle and comprise inlet bores 44 conducting the combustible gas mixture to discharge orifices 45. The discharge orifices may be of the customary type and shaped according to the kind of fuel gas employed, and are of suitable size and number. The central oxygen passage of the nozzle includes inlet portion 46 that is preferably cylindrical and which conducts the oxygen to a throat portion 47. The throat portion is preferably cylindrical and has a length between one and three times its diameter, and the diameter of the inlet portion 46 is larger than the diameter of the throat portion by a ratio preferably greater than 2.3. A portion 48 of the passage joining the inlet 46 to the throat 47 preferably has an included angle which is no greater than 60 degrees so that the reduction of diameter of the stream will not be too sudden.

The oxygen passage from the throat portion to the outlet orifice end 49 is a divergent portion 50. This portion 50 may be conical in form and has an included angle between 6 and 10 degrees, the preferred angle being close to 6 degrees. The expansion ratio is preferably such that the ratio of the area of the outlet orifice end 49 over the cross-sectional area of the throat 47 is between 3.35 to 7.35, according to the results desired. For example, for highest speed cutting of 12 to 16 inch thick steel the expansion ratio may be about 3.35 to provide a discharge pressure of about 30 p. s. i. absolute; but for highest speed cutting of about 2-inch thicknesses the expansion ratio should preferably be about 5.15 to provide a discharge pressure of about 17 p. s. i. absolute. To provide a discharge pressure of about 12.5 p. s. i. absolute the expansion ratio should be about 6.35. For 20 p. s. i. absolute discharge pressure the expansion ratio would be about 4.70.

The nozzle embodiment of Fig. 3 differs from that of Fig. 2 only in the shape of the approach portion 48'. The approach portion 48' is provided with a very long taper so that the reduction in diameter of the oxygen stream is very gradual. The long gradual approach portion is easily produced if the nozzle is made by a swaging operation. Although the nozzles illustrated in Figs. 2 and 3 are of unitary construction, nozzles of the customary types of construction can be employed, such as the two-piece construction comprising internal and external members or a stub type construction in which a short tip end is secured to the main body of the nozzle. In any form of construction the cutting oxygen passage will have the proportions and arrangement as described above in connection with Figs. 2 and 3.

In operation the container 10 will be filled with a charge of liquid oxygen by forcing a supply of oxygen through the liquid inlet 13, the vapors produced being discharged through the pipe 14 if necessary to keep the pressure in the vessel from exceeding the working pressure for which the vessel 10 is designed. Valves 13' and 14' will then be closed and valve 16' opened and the pump 17 started in the manner required according to the pump construction. Liquid oxygen is thus drawn from the container 10, pumped through the vaporizer coil 19, and heated therein to produce gaseous oxygen under pressure at approximately room temperature. The gaseous oxygen accumulates under pressure in the pipe line 21 and receiver 22 until about 550 to 600 pounds p. s. i. pressure is reached. The pressure switch 23 will then be operated to shut down the pump. As the pressure falls due to consumption of oxygen from the pipe line 21 the pressure switch will close and start the pump. The pressure switch may be adjusted to operate at desired upper and lower pressures within the range 450 to 600 p. s. i. to maintain the supply of oxygen at such desired pressures.

Valves 33 and 37 are opened and the regulators 35 and 39 are set to deliver preheating oxygen and preheating acetylene at the desired pressure; for example, about 12 to 15 pounds p. s. i. gauge. The acetylene and heating oxygen valves at 31 are successively opened and the mixed gases issuing from the nozzle are ignited, the valves at 31 being then adjusted to provide the heating flame at the nozzle of the proper size and intensity. The nozzle N is positioned at a starting edge of the workpiece W so that the heating flames impinge on the edge and raise the spot thereon to the ignition temperature. The upper cutting oxygen valve of the valves at 31 is opened and the motor of the cutting machine 27 is energized. The cutting oxygen will flow through the high pressure hose 32 direct to the nozzle N through the inlet 46, be gradually reduced in diameter to flow through the throat 47, and then expand in the divergent portion 50 to the preselected exit pressure. The oxygen jet so produced impinges on the steel surface and thermochemically combines with the metal to form a slag that is driven out of the kerf 26 by the force of the oxygen. The kerf is produced at a relatively rapid speed of advance by the progressive advance of the nozzle N across the work surface.

It will be seen that this invention provides a process of and apparatus for severing metal bodies at speeds which are 60% to 275% faster than the usual recommended speeds with customary methods and apparatus and with such speeds the cost per foot of cut is reduced 22% to 69% while the quality of cut produced at the highest speeds is at least equal to the best quality produced by customary procedure. When the initial temperature of ferrous metal bodies to be cut is high the speeds are much higher and also substantially faster than obtained by customary methods. The highest speed cutting is particularly useful for straight production cutting of steel plates, bars and billets and for this purpose various straight-line cutting machines may be used provided they are capable of traversing the blowpipe at the required speed. Such machines may be of the general type illustrated at 27 in Fig. 1 or may be a more special type such as that described in U. S. Patent application Serial No. 600,470 filed June 20, 1945, by L. W. Young and T. S. James, which provides an angular blowpipe movement for counteracting the effects of cutting lag so that even greater cut-off speeds can be obtained. For shape cutting, any of the usual shape cutting machines can be used which can move the blowpipe at the required speed, for example, the type described in U. S. Patent No. 1,774,865, and for shape cutting it will usually be desirable to operate the process to produce the highest quality cuts as described herein at speeds which are also much greater than obtained by customary shape cutting procedures.

The process of the present invention is also adaptable to cutting metals which are very difficult to cut with oxygen alone, such for example as stainless steels and high chromium alloys. For such cutting there is added to the cutting jet of the present invention, a stream of powdered adjuvant material such as described in the U. S. Patent application Serial No. 584,715 filed March 24, 1945, by R. L. Wagner, now Patent No. 2,451,422, issued October 12, 1948, and the cutting speeds obtained are substantially greater than the speeds obtained with the oxygen jets to which the powder adjuvant is added as set forth in said application.

What is claimed is:

1. A method of cutting metal bodies in which a jet of oxygen is directly progressively against the surface of the body from a nozzle having a passage including an inlet portion, a constricted throat portion, and a divergent portion adapted to increase the velocity of flow to values substantially above the acoustic, which method comprises supplying to said passage gaseous oxygen at normal ambient temperature and a pressure between 450 and about 600 p. s. i. gauge.

2. A method of cutting metal bodies in which a jet of oxygen is directed progressively against the surface of the body from a nozzle having a passage including an inlet portion, a constricted throat portion, and a divergent portion adapted to increase the velocity of flow to values substantially above the acoustic, which method comprises supplying to said passage gaseous oxygen at normal ambient temperature and a pressure between 450 and about 600 p. s. i. gauge and discharging said jet after such expansion to a mouth pressure between 20 and 30 p. s. i. absolute for severing the metal body at high speed.

3. A method of cutting metal bodies in which a jet of oxygen is directed progressively against the surface of the body from a nozzle having a passage including an inlet portion, a constricted throat portion, and a divergent portion adapted to increase the velocity of flow to values substantially above the acoustic, which method comprises supplying to said passage gaseous oxygen at normal ambient temperature and a pressure between 450 and about 600 p. s. i. gauge and discharging said jet after such expansion with a mouth pressure between about 10 and 15 p. s. i. absolute for producing high quality cuts.

4. A method of cutting metal bodies at high speed which comprises providing an oxygen stream having a pressure between 450 and about 600 p. s. i. gauge; effecting a reduction of the diameter of such stream by an amount such that the ratio of the initial diameter over the reduced diameter is greater than about 2.3; flowing such stream at constant reduced diameter for a distance between one and three times said reduced diameter; effecting expansion of the stream at a rate to increase its velocity and an amount such that its cross-sectional area is increased 3.35 to 5.6 times; and discharging the stream at a pressure between 18 to 30 p. s. i. absolute against the metal body to be cut, the portion of the body impinged by the stream being at an ignition temperature.

5. A method of cutting metal bodies at high speed which comprises providing an oxygen stream having a pressure between 450 and 600 p. s. i. gauge; effecting a gradual reduction of the cross-section of said stream; flowing such stream at constant reduced diameter for a distance between one and three times said reduced diameter; effecting expansion of the stream at a rate to increase its velocity and an amount such that its cross-sectional area is increased 3.35 to 7.45 times; and discharging the stream at a pressure between 10 to 30 p. s. i. absolute against the metal body to be cut, the portion of the body impinged by the stream being at an ignition temperature.

6. A method of cutting metal bodies at high speed which comprises providing an oxygen stream having a pressure between 450 and 600 p. s. i. gauge; effecting a gradual reduction of the cross-section of said stream; flowing such stream at constant reduced diameter for a distance between one and three times said reduced diameter; effecting expansion of the stream at a rate to increase its velocity and an amount such that its cross-sectional area is increased 3.35 to 7.45 times; and discharging the stream at a pressure between 10 to 30 pounds, p. s. i. absolute against the metal body to be cut, the portion of the body impinged by the stream being at an ignition temperature, said increase of cross-sectional area and value of the discharge pressure being selected according to the speed and quality of the cut desired.

7. A method of cutting metal bodies at high speed which comprises providing an oxygen stream having a pressure between 450 and about 600 p. s. i. gauge; effecting a gradual reduction of the cross-section of said stream; flowing such stream at constant reduced diameter for a distance between one and three times said reduced diameter; effecting expansion of the stream at a rate to increase its velocity and an amount such that its cross-sectional area is increased 5.5 to 7.5 times; and discharging the stream at a pressure between 10 to 15 p. s. i. absolute against a metal body to be cut, the portion of the body impinged by the stream being at ignition temperature.

8. A nozzle for oxygen cutting of metals, said nozzle having an oxygen passage therethrough including a cylindrical inlet portion, an intermediate cylindrical throat portion, a convergent portion between the inlet portion and the throat, and a divergent portion extending from the throat to a discharge mouth, in which: the ratio of the diameter of the inlet portion to the throat portion is not less than 2.3; the throat portion has a length between one and three times the diameter; the ratio of the cross-sectional area at the discharge mouth over the cross-sectional area at the throat is between 3.35 and 7.45; and the included angle between the walls of the divergent portion is less than 10 degrees.

9. A nozzle according to claim 8 in which the included angle of the convergent portion is no greater than 60 degrees.

10. In an apparatus for the rapid oxygen cutting of metals including mechanism for holding and traversing a blowpipe nozzle at desired speed along a path adjacent a surface of a metal body to be cut, and means for supplying to said nozzle oxygen under a pressure of between 450 and 600 p. s. i. gauge; the improvement comprising a nozzle having an oxygen passage therethrough including a cylindrical inlet portion, an intermediate cylindrical throat portion, a convergent portion between the inlet portion and the throat, and a divergent portion extending from the throat to a discharge mouth, in which: the ratio of the diameter of the inlet portion to the throat portion is not less than 2.3; the throat portion has a length between one and three times the diameter; the ratio of the crosstional area at the discharge mouth over the cross-sectional area at the throat is between 3.35 and 7.45; and the included angle between the walls of the divergent portion is less than 10 degrees.

ROGER S. BABCOCK.

(References on following page)

REFERENCES CITED

The following references are of record in the file of this patent:

UNITED STATES PATENTS

| Number | Name | Date |
|---|---|---|
| 1,839,646 | Coberly | Jan. 5, 1932 |
| 1,958,044 | Hendricks | May 8, 1934 |
| 1,985,080 | Crowe | Dec. 18, 1934 |
| 2,175,160 | Zobel et al. | Oct. 3, 1939 |
| 2,195,384 | Zobel et al. | Mar. 26, 1940 |
| 2,205,499 | Smith | June 25, 1940 |
| 2,259,956 | Jones | Oct. 21, 1941 |
| 2,343,958 | Crowe | Mar. 14, 1944 |
| 2,430,531 | Oldham | Nov. 11, 1947 |

FOREIGN PATENTS

| Number | Country | Date |
|---|---|---|
| 506,504 | Great Britain | May 30, 1939 |